(12) United States Patent
Tsirkin et al.

(10) Patent No.: US 9,489,223 B2
(45) Date of Patent: Nov. 8, 2016

(54) VIRTUAL MACHINE WAKEUP USING A MEMORY MONITORING INSTRUCTION

(71) Applicant: Red Hat Israel, Ltd., Raanana (IL)

(72) Inventors: Michael Tsirkin, Raanana (IL); Avi Kivity, Raanana (IL); Dor Laor, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 280 days.

(21) Appl. No.: 13/686,315

(22) Filed: Nov. 27, 2012

(65) Prior Publication Data

US 2014/0149979 A1    May 29, 2014

(51) Int. Cl.
G06F 9/455 (2006.01)
G06F 9/44 (2006.01)

(52) U.S. Cl.
CPC ......... *G06F 9/45533* (2013.01); *G06F 9/4418* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 7,290,178 B2 * | 10/2007 | Rothman et al. | 714/39 |
| 8,239,610 B2 * | 8/2012 | van Riel et al. | 711/6 |
| 8,301,860 B2 * | 10/2012 | Cyr et al. | 711/170 |
| 2005/0132365 A1 * | 6/2005 | Madukkarumukumana et al. | 718/1 |
| 2010/0332753 A1 * | 12/2010 | Gray et al. | 711/118 |
| 2011/0161541 A1 * | 6/2011 | Madukkarumukumana et al. | 710/260 |

OTHER PUBLICATIONS

Ott, Virtualization and Performance: Understanding VM Exits, Jun. 25, 2009, software.intel.com/en-us/blogs/2009/06/25/virtualization-and-performance-understanding-vm-exits.*
Intel, Prescott New Instructions Software Developer's Guide, Jan. 2004, www.intel.com, pp. 3-25 to 3-28, 4-8 to 4-10, 1-6, A-1 to A-4.*

* cited by examiner

*Primary Examiner* — Lewis A Bullock, Jr.
*Assistant Examiner* — Bruce S Ashley
(74) *Attorney, Agent, or Firm* — Lowenstein Sandler LLP

(57) ABSTRACT

A method and system for managing a virtual computing system including an event source configured to send an event to a destination virtual machine (VM) executing a memory monitoring instruction on a designated address range of a host memory. A hypervisor instructs a destination virtual central processing unit (VCPU) associated with the destination VM to execute the memory monitoring instruction to the designated address range of a memory. A physical CPU associated with the designated address range is configured not to perform an exit to the hypervisor in response to execution of the memory monitoring instruction by the destination VCPU. The hypervisor instructs an event source to write data to the designated address range to send an event for performance by the destination VM, wherein the destination VM wakes up and performs the identified event in response to the event source writing to the identified address range.

14 Claims, 5 Drawing Sheets

VIRTUAL MACHINE WAKEUP USING A MEMORY MONITORING INSTRUCTION

TECHNICAL FIELD

Embodiments of the present disclosure relate to a computer system, and more specifically, to managing the delivery of an event from an event source to a virtual machine for performance by a virtual central processing unit (VCPU) based on memory monitoring instructions in a virtualized computing system.

BACKGROUND

In order to preserve power resources and lower overhead usage, conventional host (physical) CPUs utilize memory monitoring instructions (e.g., monitor and mwait instructions) designating a range of memory that allow the host CPU to stop instruction execution and await receipt of an event to execute. In a virtualized computing system wherein a single virtual CPU (VCPU) of a virtual machine (VM) runs on a single host CPU, the virtual machine may execute a memory monitoring instruction on the designated address range, such that the VCPU and associated host CPU are blocked from further execution and enters a wait state until there is a change to the designated memory from an event source or an inter-processor interrupt is received.

Furthermore, in a virtualized system wherein multiple VCPUs are running on a single physical CPU, execution of memory monitoring instructions by any of the multiple VCPUs causes the underlying physical CPU to stop execution and await an event, thereby resulting in an inefficient system wherein time and resources are wasted while the physical CPU is in this idle or standby mode.

DETAILED DESCRIPTION

Figure 1:
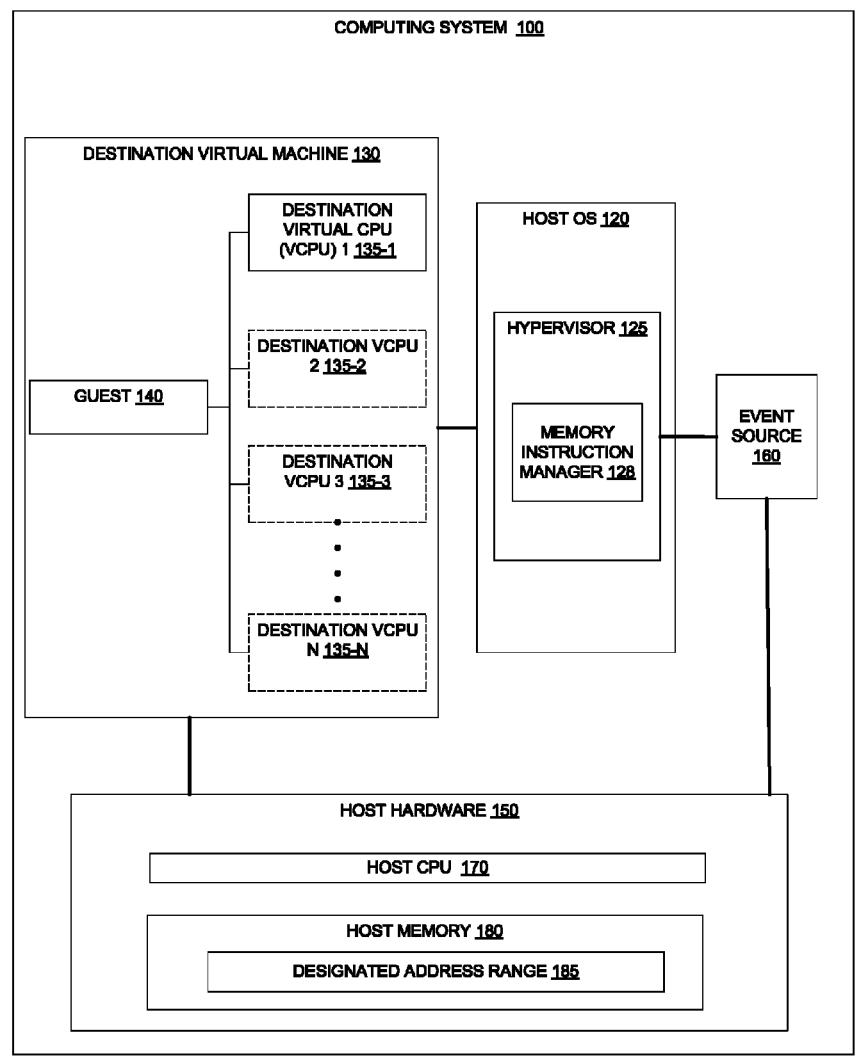
FIG. 1 is a block diagram of an example computer system configured to allow an event source to deliver an event for performance by a virtual machine CPU associated with a virtual machine, according to examples of the present disclosure.

Disclosed herein are methods and systems for managing a virtual computing system including a virtual machine (VM) configured to execute a memory monitoring instruction on a designated address range of a host memory and await receipt of an event from an event source. Upon receipt of the event, the virtual machine (also referred to as the "destination VM") wakes up (e.g., exits an idle state) and a virtual central processing unit (VCPU) (also referred to as the "destination VCPU") running on a host CPU performs the event requested by the event source. In an example, a single destination VCPU is running on a single host CPU.

The virtual computing system includes a hypervisor configured to place the destination VM into a "memory monitoring mode". In the memory monitoring mode, the hypervisor disables an exit of the destination VM upon execution of a memory monitoring instruction by the destination VCPU on designated address block. Accordingly, in the memory monitoring mode, the host CPU underlying the destination VCPU is configured so that execution of the memory monitoring instruction does not cause an exit to the hypervisor.

The hypervisor further instructs the destination VCPU to execute the memory monitoring instruction to the designated address range. The hypervisor instructs the event source (e.g., a physical CPU, a hardware device, a source VCPU) to write data to the designated address range (e.g., modify the designated memory) in order to send a request for the performance of an event or action (e.g., the sending of a network packet) by the destination VCPU of the destination VM. After receiving the event, the destination VCPU may retrieve event information from the event source.

Accordingly, an efficient method and system is provided that enables an event source to send events for performance by a VCPU running on a host CPU using memory monitoring instructions, without causing an exit to the hypervisor. The avoidance of an exit to the hypervisor allows for the delivery of event requests to the destination VCPU without the trapping of the event instructions by the hypervisor and the computational and time expense associated with a conventional interrupt (e.g., the computational/time expense associated with jumping to an interrupt vector).

In another example, multiple destination VCPUs of a destination VM may run on a single host CPU. In this example, the hypervisor determines when to switch the multiple destination VCPUs of the destination VM from a "legacy mode" to the memory monitoring mode. In a legacy mode, upon the execution of the memory monitoring instruction by one of the multiple destination VCPUs, a VM exit is performed and there is a transition to the hypervisor. Having transitioned to the hypervisor, the guest operating system of the destination virtual machine sends one or more interrupt instructions to wake up the multiple destination VCPUs of the destination virtual machine. In the legacy mode, the events sent by the event source pass through the hypervisor.

As described above, in the memory monitoring mode, the hypervisor disables the VM exit upon execution of a memory monitoring instruction by one or more of the multiple destination VCPUs of the destination VM, such that there is no transition to the hypervisor and the events do not pass through the hypervisor.

When multiple VCPUs are running on a single host CPU, the hypervisor may place the destination VM in legacy mode (e.g., the execution of a memory monitoring instruction by one of the multiple VCPUs of the destination VM causes a VM exit and transition to the hypervisor). Following the VM exit, events sent by an event source for execution by the destination VM are received by the hypervisor. The hypervisor may determine the destination VCPU of the multiple VCPUs for the event (herein the "particular VCPU") and perform a measurement of a frequency of events that are intended for the particular VCPU in order to determine an amount of time that the destination VM and underlying host CPU are in a wait mode (waiting idly for another event). If the frequency of events is above a threshold (herein the "event frequency threshold") then the hypervisor determines that wait time between the receipt of events for the particular VCPU is short, and the hypervisor may switch the particular VCPU into the memory monitoring mode. Examples of a method for determining when to switch from the legacy mode to the memory monitoring mode are described in more detail below in connection with FIG. 3.

In an example of the present disclosure, the hypervisor detects when to switch a particular VCPU from the memory monitoring mode to the legacy mode. If a particular VCPU in the memory monitoring mode executes a memory monitoring instruction and waits for an extended period of time without receiving an event, a timer interrupt is triggered (i.e., a timer expires and the particular VCPU has not received an event). The hypervisor may determine whether the particular VCPU is executing a memory monitoring instruction at the time it was interrupted. If so, the hypervisor determines that the particular VCPU wasted some amount of time and memory in wait mode, and performs a measurement of a frequency that the particular VCPU is executing memory monitoring instruction at the time an interrupt is received(herein the "memory monitoring frequency"). The hypervisor compares the memory monitoring frequency for the particular VCPU to a threshold (herein the "memory monitoring threshold"), and if the memory monitoring frequency exceeds the memory monitoring threshold, the hypervisor switches the particular VCPU from the memory monitoring mode to the legacy mode. Example methods for determining when to switch from the memory monitoring mode to the legacy mode are described in more detail below in connection with FIG. 4.

Accordingly, an efficient method and system is provided that enables a hypervisor to switch a destination virtual machine including multiple VCPUs from a legacy mode to a memory monitoring mode, in order to minimize an amount of time the VCPUs and underlying host CPU spend waiting for an event in a wait mode and maximize the utilization of memory in the virtualized system.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing system 100 in which examples of the present disclosure may operate. The computing system 100 hosts a virtual machine (VM) 130, also referred to as the "destination VM". The destination VM 130 runs a guest (e.g., guest 140) that uses a guest operating system to manage its resources. The virtual machine 130 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU (e.g., the one or more destination VCPUs 135), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In one example, the computing system 100 runs a hypervisor 125 to virtualize access to the underlying host hardware 150, making the use of the virtual machine 130 transparent to the guest 140 and the users of the computing system 100. The hypervisor 125 may support the virtual machine 130. In one example, the hypervisor 125 is part of a host operating system (OS) 120.

The computing system 100 also includes hardware components (host hardware) including a host central processing unit (CPU) 170. The computing system 100 may also include memory 180, input/output (I/O) devices and other hardware components (not shown). In one example, a single destination VCPU 135-1 (e.g., VCPU 1 in FIG. 1) runs on the host CPU 170 configured to handle event requests from an event source 160 in accordance with the method described in connection with FIG. 2. Example event requests submitted by the event source include a request to transmit a packet, a request to perform a disk I/O operation, a request to output an image to a display, a request to send data on a serial port, etc. In another example described below in connection with FIGS. 3 and 4, multiple destination VCPUs (e.g., destination VCPUs 135-1, 135-2, 135-3, . . . 135-N) may run on a single host CPU 170. Example event sources 160 include another physical CPU, a virtual CPU, a hardware device, etc.

In an example, the hypervisor 125 includes a memory instruction manager 128 configured to place the host CPU 170 upon which the single destination VCPU 135-1 is running into the memory monitoring mode, such that the execution of a memory monitoring instruction by the destination VCPU 135-1 does not result in a VM exit or transition of control to the hypervisor 125. For example, the hypervisor 125 may use a bitmap configured to manage which instructions cause a VM exit and switch to hypervisor mode, and set the bitmap such that the execution of the memory monitoring instruction by the destination VCPU-1 does not trigger the VM exit.

The memory instruction manager 128 can instruct the event source 160 to write data to a designated address range 185 in order to wake up the destination VCPU 135-1 of the destination VM 130 for performance of the event, without causing an exit to the hypervisor 125. It is noted that the memory designation instruction may be provided by the hypervisor 125 to the event source 160 either prior to or following the execution of a memory instruction (e.g., a wait instruction) by the destination VCPU 135-1 on the designated memory range 185. In an example, the memory instruction manager 128 is also configured to notify the destination VCPU 135-1 to execute a memory monitoring instruction to the designated address range 170 and await receipt of the event from the event source 160. After receiving the event, the host CPU 170 may retrieve event information from the event source 160.

In an example, the memory instruction manager 128 is configured to manage the memory range designations and assignments. In this example, the memory instruction manager 128 may reserve different memory ranges for different types of event sources (e.g., a physical CPU, a VCPU, a hardware device, etc.). For example, a first designated memory range may be dedicated for use by a CPU, a second designated memory range may be dedicated for use by a VCPU, a third designated memory range may be dedicated for use by one or more devices (e.g., a printer, a display), etc.

In an example, the memory 180 and/or the designated memory range 185 may include a portion which is protected and not writeable by the event source 160. In an example, the protected portion may be writeable by another event source (e.g., a second host CPU) in order for the second host CPU to wake up the destination VM 130 to receive and perform a requested event.

Advantageously, the delivery of events from the event source 160 to the destination VM 130 using memory monitoring instructions, without causing an exit to the hypervisor, results in the avoidance of the trapping of instructions by the hypervisor 125 and the reduction in the computational and time expenses associated with the jumping to an interrupt vector associated with a conventional interrupt of a physical CPU.

Figure 2:
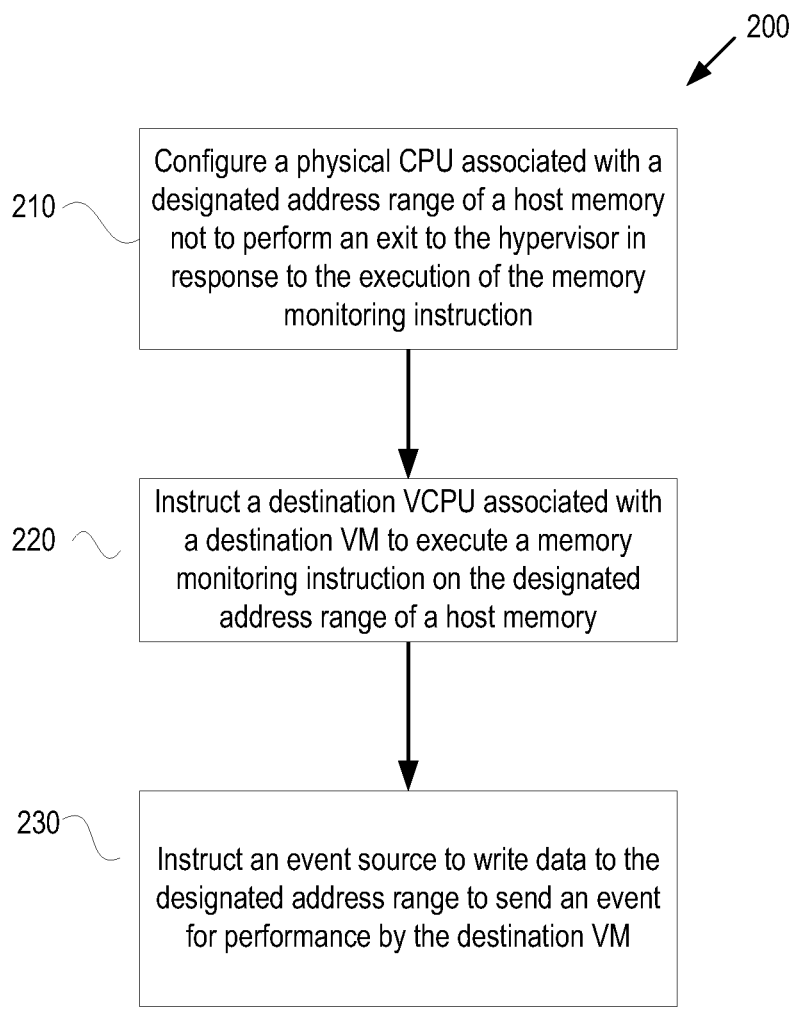
FIG. 2 is a flow diagram of an example method executed by a virtual machine for managing the delivery of an event for execution by a destination VM using a memory monitoring instruction, according to an embodiment of the present disclosure.

FIG. 2 is a flow diagram illustrating an example of a method 200 for the delivery of an event, by an event source, for execution by a destination VM including a single destination VCPU running on a single host CPU using a memory monitoring instruction, without causing an exit to a hypervisor managing the destination VM. The method 200 may be performed by a computer system 100 of FIG. 1 and/or computer system 300 of FIG. 3 and may comprise hardware (e.g., circuitry, dedicated logic, programmable logic, microcode, etc.), software (e.g., instructions run on a processing device), or a combination thereof. In one example, the method 200 is performed by the memory instruction manager 128 of the hypervisor 125 of FIG. 1.

As shown in FIG. 2, in block 210, the hypervisor configures the host physical CPU (e.g., host CPU 170 of FIG. 1) associated with a designated address range of the host memory (e.g., the designated address range 185 of host memory 180 of FIG. 1) not to perform an exit to the hypervisor in response to the execution of a memory monitoring instruction by a VCPU of a destination VM. In an example, execution of the memory monitoring instruction by the VCPU of the destination VM places the destination VCPU (e.g., VCPU 135-1 of VM 130 in FIG. 1) running on the host CPU into the memory monitoring mode.

In block 220, the hypervisor instructs the destination VCPU of the destination VM to execute a memory monitoring instruction to the designated address range of the host memory. In one example, the destination VCPU executes a memory monitoring instruction (e.g., a monitor instruction or an mwait instruction) on the designated address range and enters a wait mode.

In block 230, the hypervisor instructs the event source to write data to the designated address range to send an event for performance by the destination VM. In addition, prior to the execution of method 200, a hypervisor (e.g., hypervisor 125 of FIG. 1) provides a notification to a VCPU of a destination VM identifying an address range that may be written to by the VCPU in order to deliver an event to a host CPU. It is noted that the aforementioned setup steps may be performed in any order, e.g., the memory monitoring instruction may be executed before the hypervisor provides the notification to the event source, or vice versa.

In an example, the designated memory range may include a portion that is protected and not writeable by the event source. Optionally, the protected portion of the designated memory range may be reserved for use by another host CPU. In an example, the event source may write to a portion of the designated memory range which is dedicated for use by a VCPU, another host CPU, or a hardware device.

Advantageously, the method 200 realizes the benefit of allowing an event source to deliver event requests for performance by a VCPU using memory monitoring instructions without causing a VM exit to the hypervisor, thereby reducing the computational and time overhead associated with the VM exit communication protocol and without a conventional interrupt and the associated computational/time expense associated with jumping to an interrupt vector.

Figure 3:
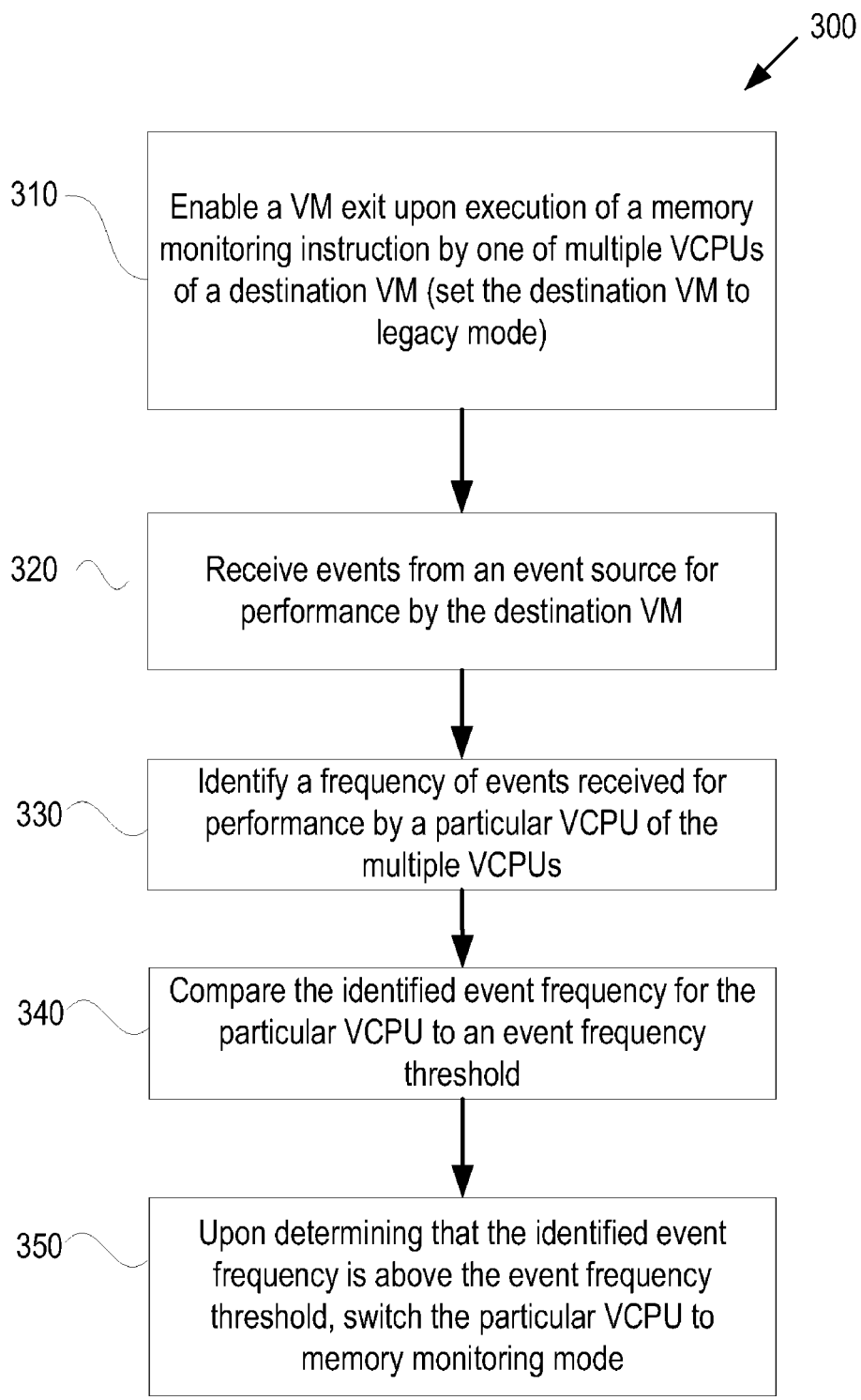
FIG. 3 is a flow diagram of an example method executed by a hypervisor for determining when to switch a destination VCPU from a legacy mode to a memory monitoring mode, according to an embodiment of the present disclosure.

FIG. 3 is a flow diagram illustrating one example of a method 300 for determining when to switch a destination VCPU from the legacy mode to the memory monitoring mode in a system wherein multiple VCPUs are running on a single host CPU (e.g., destination VCPUs 135-1, 135-2, 135-3, . . . and 135-N of destination VM 130 running on host CPU 170 in FIG. 1). In an example, the setting of the mode (i.e., either the legacy mode or the memory monitoring mode) is performed on a per destination VM basis, such that the multiple destination VCPUs of the destination VM are all placed in the same mode.

Figure 5:
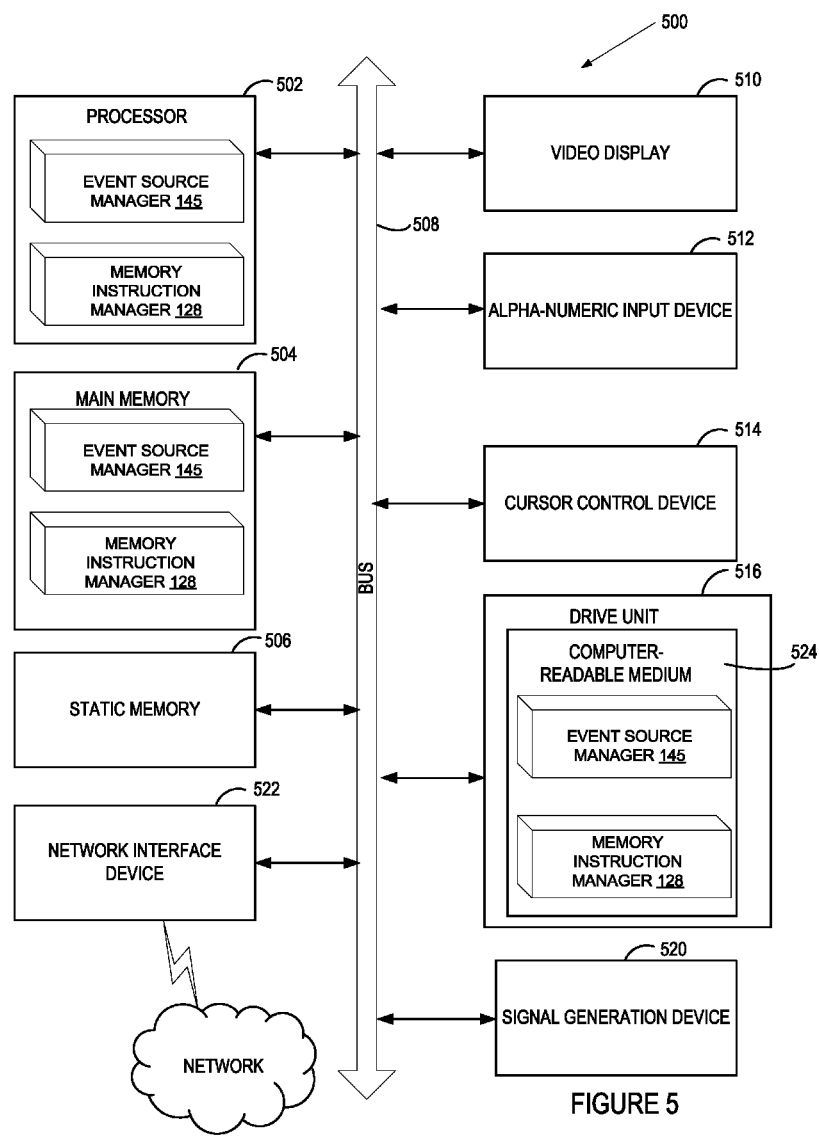
FIG. 5 illustrates a diagrammatic representation of an example event delivery management system, according to an embodiment of the present disclosure.

The method 300 may be performed by a computer system 100 of FIG. 1 or computer system 500 of FIG. 5 that may comprise hardware (e.g., circuitry, dedicated logic, programmable logic, microcode, etc.), software (e.g., instructions run on a processing device), or a combination thereof. In one example, the method 300 is performed by the memory instruction manager 128 of the hypervisor 125 of FIG. 1.

In one example, the hypervisor enables a VM exit upon execution of a memory monitoring instruction by one of the multiple VCPUs of a destination VM, in block 310. By enabling the VM exit, the multiple destination VCPUs are entered into legacy mode, wherein following execution of the memory monitoring instruction, the destination VCPUs wait until the guest sends an interrupt to wake up the VCPUs. Furthermore, in legacy mode, event requests from an event source (e.g., the event source 160 of FIG. 1) are passed through the hypervisor.

In block 320, the hypervisor receives events from the events source for performance by a destination VCPU of the destination VM. The hypervisor identifies a frequency of events received for performance by a particular VCPU (e.g., VCPU 2 (135-2) of FIG. 1) of the multiple VCPUs of the destination VM, also referred to as the event frequency. In an example, the event frequency for a particular VCPU may be determined by counting the number of events intended for a specific VCPU over a period of time. In an example, the period of time may be any suitable amount of time, such as for, example, a one second time frame, a 10 millisecond time frame, or a period of a host CPU timer interrupt. The event frequency is a representation of an amount of time that the particular VCPU and underlying host CPU are waiting idly for another event. In an example, the event frequency for each of the multiple VCPUs of the destination VM may be determined and aggregated to determine an event frequency at the destination VM level.

In an example, the aggregated data or statistics associated with the multiple destination VCPUs may be collected over multiple periods of time. In this example, a factor (which may be a function of time) may be used to assign a greater weight to more recent events (e.g., events occurring in a more recent time period). In an example, X number of events may be collected during a first period and Y number of events may be collected during a second period (occurring after the first period). The number of events to compare to the threshold before the second period is X. The number of events to compare to the threshold after the second period may be weighted (with more weight assigned to the Y events occurring in the second period) using the factor (e.g., a factor of ½) and equal X/2+Y.

In block 340, the hypervisor compares the identified event frequency for the particular VCPU to a threshold (i.e., the event frequency threshold) to determine if the amount of waiting (as represented by the event frequency) is acceptable (e.g., the particular VCPU is receiving events with a sufficient frequency to be above the event frequency threshold). In block 350, if the hypervisor determines that the event frequency is above the event threshold (indicating that the particular VCPU is not spending an unacceptable amount of time waiting for an event), the hypervisor switches the particular VCPU from the legacy mode to the memory monitoring mode. In an example, switching to the memory monitoring mode indicates that the particular VCPU is sufficiently active (e.g., receiving events on a frequent basis) to enable placement of the particular VCPU in the memory monitoring mode without wasting an unacceptable amount of time in the wait mode associated with the memory monitoring mode for a next event.

In another example, the hypervisor may measure an average amount of time between multiple events and/or interrupts coming into the particular VCPU or the destination VM. If the average amount of time between events/interrupts for the particular VCPU/destination VM is below a predetermined threshold, then the hypervisor may determine it is safe to switch the particular VCPU/destination VM to the memory monitoring mode since an acceptable amount of time is passing between events. Accordingly, in this case, switching to the memory monitoring mode will not result in a significant waste of time with the particular VCPU and underlying host CPU waiting in an idle mode waiting for an event and/or an interrupt.

According to the example method 300, the hypervisor may efficiently determine when to switch a scalable destination VM having multiple VCPUs from the legacy mode to the memory monitoring mode to enable the delivery of an event request by an event source to a destination VM using memory monitoring instructions, without causing a VM exit to the hypervisor.

Figure 4:
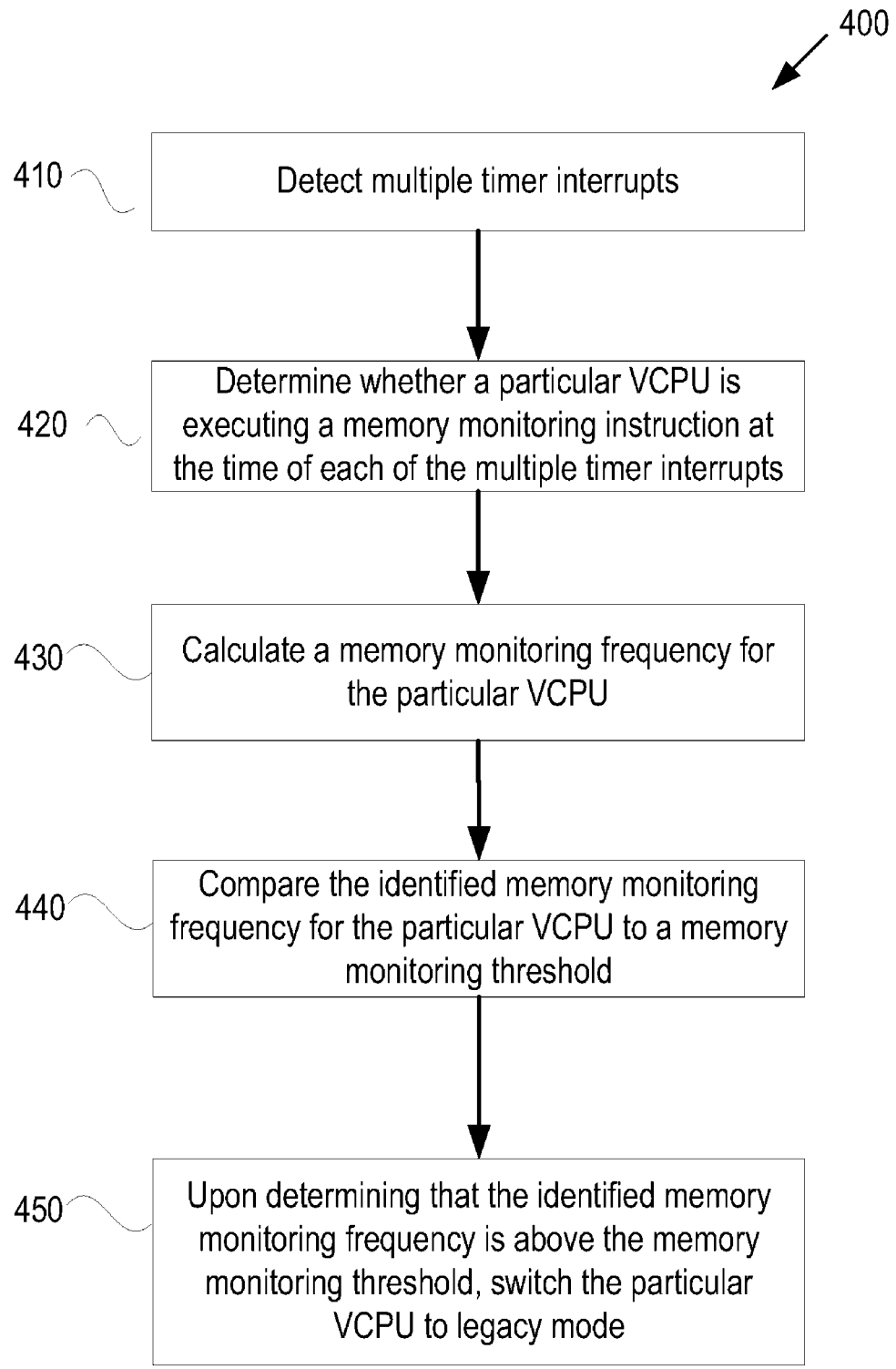
FIG. 4 is a flow diagram of an example method executed by a hypervisor for determining when to switch a destination VCPU from a memory monitoring mode to a legacy mode.

FIG. 4 is a flow diagram illustrating one example of a method 400 for determining when to switch a destination VCPU from the memory monitoring mode to the legacy mode in a system wherein multiple VCPUs are running on a single host CPU (e.g., destination VCPUs 135-1, 135-2, 135-3, . . . and 135-N of destination VM 130 running on host CPU 170 in FIG. 1). As described above, the setting of the mode (i.e., either the legacy mode or the memory monitoring mode) is performed on a per destination VM basis, such that the multiple destination VCPUs of the destination VM are all placed in the same mode.

The method 400 may be performed by a computer system 100 of FIG. 1 or computer system 500 of FIG. 5 that may comprise hardware (e.g., circuitry, dedicated logic, programmable logic, microcode, etc.), software (e.g., instructions run on a processing device), or a combination thereof. In one example, the method 400 is performed by the memory instruction manager 128 of the hypervisor 125 of FIG. 1.

In an example, if a destination VCPU/destination VM which executed a memory monitoring instruction is in wait mode and does not receive an event and/or interrupt after a set period of time, a timer expires and an interrupt is triggered (herein referred to as the "timer interrupt"). In such a case, it is advantageous to switch the destination VCPU which is in wait mode (following execution of the memory monitoring instruction) at the time of the timer interrupt to the legacy mode, to minimize the amount of time and memory that is being wasted.

In block 410, with the multiple destination VCPUs running on a single host CPU in the memory monitoring mode, the hypervisor detects multiple timer interrupts received by a particular destination VCPU. In block 420, the hypervisor determines whether the particular destination VCPU is executing a memory monitoring instruction (i.e., in wait mode) at the time of each of the multiple timer interrupts. For example, the hypervisor may determine the number of timer interrupts received over a sample period of time (e.g., every second) and the number of times the destination VCPU was executing a memory monitoring instruction at the time of those timer interrupts.

In block 430, the hypervisor calculates a memory monitoring frequency for the particular destination VCPU over the sample period. The memory monitoring frequency is an estimation of an amount or percentage of the sample period that is wasted with the particular destination VCPU executing a memory monitoring instruction, since the hypervisor is not aware of when the particular destination VCPU entered the memory monitoring mode. In an example, the hypervisor may determine that 100 timer interrupts were received by the particular VCPU during a one second time period (e.g., sample period is one second). The hypervisor may further determine that the particular destination VCPU was in memory monitoring mode at the time of every other timer interrupt. In this case, the hypervisor may estimate that 50% of that sample period was wasted in idle mode, and calculate a memory monitoring frequency of 50%.

In block 440, the hypervisor compares the identified memory monitoring frequency for the particular VCPU to a memory monitoring threshold. If the hypervisor determines that the memory monitoring frequency exceeds the memory monitoring threshold (e.g., an unacceptable amount of time is being wasted in the idle state awaiting an event), the hypervisor switches the particular destination VCPU to legacy mode. Advantageously, in accordance with method 400, the hypervisor detects instances when it is efficient to switch a destination VCPU/destination VM to legacy mode, to avoid excessive wasting of time and memory resulting from an underutilized destination VM waiting in memory monitoring mode.

FIG. 5 illustrates a diagrammatic representation of a machine in the example form of a computer system 500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The memory instruction manager 128 shown in FIG. 1 may be executed by processor 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the memory instruction manager 128) embodying any one or more of the methodologies or functions described herein. The instructions of the memory instruction manager 128 may also reside, completely or at least partially, within the main memory 504 and/or within the processor 502 during execution thereof by the computer system 500, the main memory 504 and the processor 502 also constituting computer-readable media. The instructions of the memory instruction manager 128 may further be transmitted or received over a network via the network interface device 522.

While the computer-readable storage medium 524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a processing device executing a hypervisor, a frequency of events to be performed by a destination virtual machine (VM) exceeds an event frequency threshold;
   in response to the determining, switching the destination VM from a first mode that enables an exit to the hypervisor in response to execution of a memory monitoring instruction to a memory monitoring mode that disables the exit of the destination VM in response to execution of the memory monitoring instruction;
   in response to the switching, instructing, by the processing device, a virtual central processing unit (VCPU)

associated with the destination VM to execute a first memory monitoring instruction to a designated address range of a host memory, wherein the destination VM executes the first memory monitoring instruction to the designated address range and enters a wait mode, without causing an exit to the hypervisor in response to execution of the first memory monitoring instruction; and sending, by the processing device, an instruction to an event source to write data to the designated address range on which the destination VM is executing the first memory monitoring instruction to thereby wake up the destination VM from the wait mode and send an event for performance by the destination VM.

2. The method of claim 1, wherein the destination VM wakes up and performs the identified event in response to the event source writing data to the designated address range.

3. The method of claim 1, wherein the event source comprises at least one of a physical central processing unit CPU), a hardware device, or a source VCPU associated with a source VM.

4. The method of claim 1, wherein the designated address range comprises a protected portion not writeable by the event source.

5. The method of claim 1, wherein writing data to the designated address range comprises executing an atomic instruction.

6. The method of claim 1, wherein the hypervisor maintains an assignment of an additional address range wherein each of the additional address range is dedicated for writing to by a specific source type.

7. A computer system comprising:
a memory to store instructions; and
a processing device operatively coupled to the memory, the processing device to execute the instructions to:
determine a frequency of events to be performed by a destination virtual machine (VM) exceeds an event frequency threshold;
in response to determining the frequency of events, switch the destination VM from a first mode that enables an exit to a hypervisor in response to execution of a memory monitoring instruction to a memory monitoring mode that disables the exit of the destination VM in response to execution of the memory monitoring instruction;
in response to switching, instruct a virtual central processing unit (VCPU) associated with the destination VM to execute a first memory monitoring instruction to a designated address range of a host memory, wherein the destination VM executes the first memory monitoring instruction to the designated address range and enters a wait mode, without causing an exit to the hypervisor in response to execution of the first memory monitoring instruction; and
send an instruction to an event source to write data to the designated address range on which the destination VM is executing the first memory monitoring instruction to thereby wake up the destination VM from the wait mode and send an event for performance by the destination VM.

8. The computer system of claim 7, wherein the event source comprises at least one of a physical central processing unit (CPU), a hardware device, or a source virtual CPU associated with a source virtual machine.

9. The computer system of claim 7, wherein the designated address range comprises a protected portion not writeable by the event source.

10. The computer system of claim 7, the processing device to maintain an assignment of a plurality of additional address ranges, wherein each of the plurality of additional address ranges is dedicated for writing to by a specific source type.

11. A non-transitory computer readable storage medium comprising instructions that, when executed by a processing device, cause the processing device to:
determine a frequency of events to be performed by a destination virtual machine (VM) exceeds an event frequency threshold;
in response to determining the frequency of events, switch the destination VM from a first mode that enables an exit to a hypervisor in response to execution of a memory monitoring instruction to a memory monitoring mode that disables the exit of the destination VM in response to execution of the memory monitoring instruction;
in response to switching, instruct a virtual central processing unit (VCPU) associated with the destination VM to execute a first memory monitoring instruction to a designated address range of a host memory, wherein the destination VM executes the first memory monitoring instruction to the designated address range and enters a wait mode, without causing an exit to the hypervisor in response to execution of the first memory monitoring instruction; and
send an instruction to an event source to write data to the designated address range on which the destination VM is executing the first memory monitoring instruction to thereby wake up the destination VM from the wait mode and send an event for performance by the destination VM.

12. The non-transitory computer readable storage medium of claim 11, wherein the event source comprises at least one of a physical central processing unit (CPU), a hardware device, or a source virtual CPU associated with a source virtual machine.

13. The non-transitory computer readable storage medium of claim 11, wherein the designated address range comprises a protected portion not writeable by the event source.

14. The non-transitory computer readable storage medium of claim 11, the processing device to maintain an assignment of an additional address range, wherein the additional address ranges is dedicated for writing to by a specific source type.

* * * * *